United States Patent Office 3,546,547
Patented Dec. 8, 1970

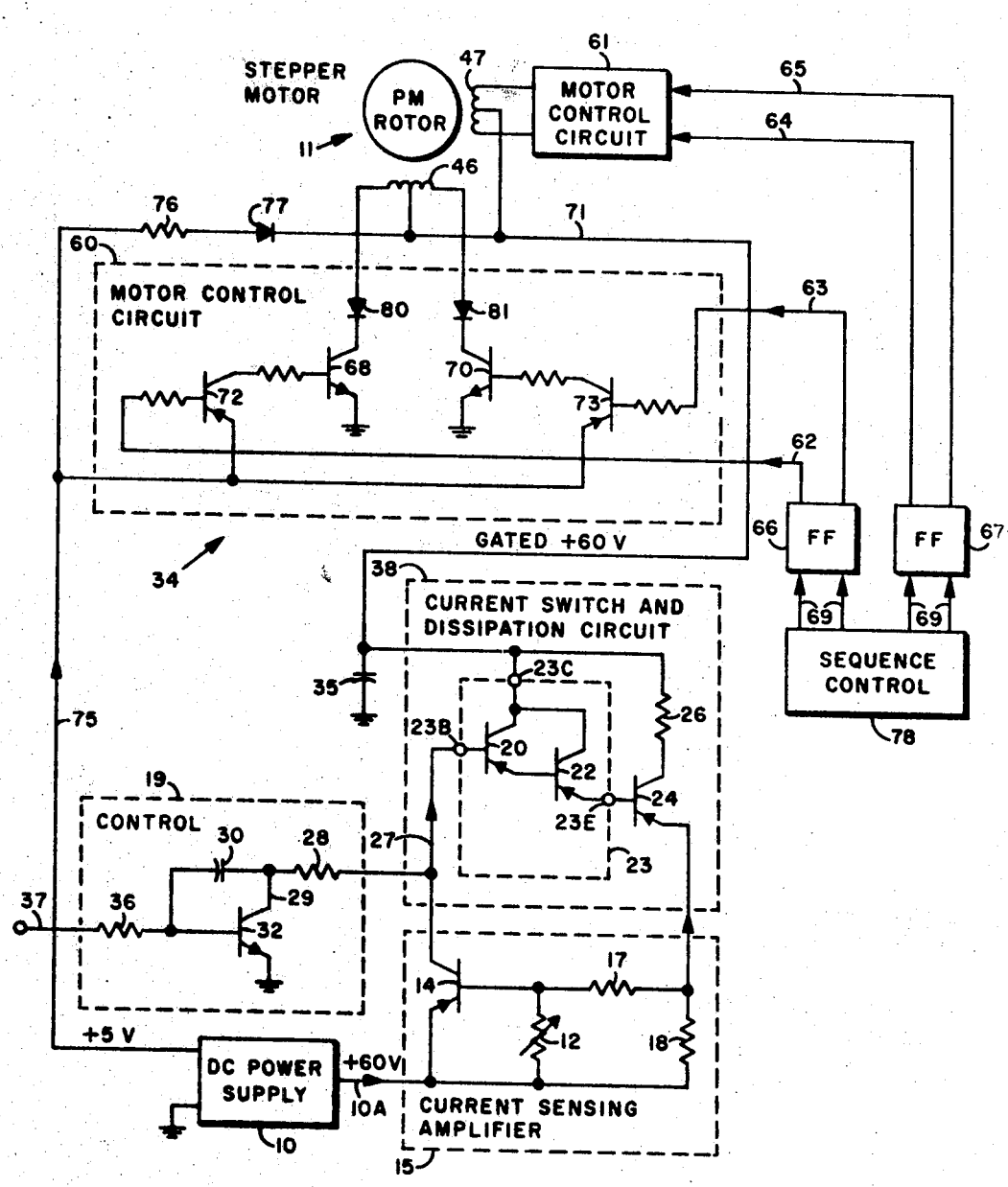

3,546,547
STEPPER MOTOR CONTROL CIRCUITS
Joseph Thomas Wallace, Phoenix, Ariz., assignor to Motorola, Inc., Franklin Park, Ill., a corporation of Illinois
Filed Aug. 12, 1968, Ser. No. 752,001
Int. Cl. H02k 29/00
U.S. Cl. 318—138                    8 Claims

ABSTRACT OF THE DISCLOSURE

A current switch selectively supplies high-voltage limited-amplitude-current power to a motor control circuit used to step a stepper motor. The current switch is constructed to accommodate varying power dissipation caused by a variable load of the stepper motor winding. A power dissipating resistor proportionally dissipates more power at higher voltage drops across the current switch, i.e., at high load conditions. The motor control circuits have isolation devices and semiconductor switching devices which permit large fly-back voltages in the winding for reducing magnetic field decay time. The stepper motor is held to a desired position by a lower power holding circuit.

BACKGROUND OF THE INVENTION

The invention relates to semiconductor type stepper motor controls and more particularly to stepper motor control circuits capable of operating at high speeds using a gated limited amplitude current supply.

Stepper motors have been used as a source of power for combining precise incremental rotations with good acceleration and torque. These motors are usable for controlling and making precise microminiature positioning movements. Such movements are typically 0.0005 inch per step. Such a motor is shown and described in U.S. Pat. No. 2,931,929 and the application referred to therein. Stepper motors are also useful for making larger positioning movements. Such motors are similar to continuously rotating motors in that a changing magnetic field condition induces power in a rotor for causing the rotor to rotate. Some stepping motors have a rotor with a permanent magnet. The magnetic field in the stator is caused to move by changing the direction and magnitude of the current in the various stator windings—the permanent magnetic rotor aligns itself with each new magnetic field. Electrical currents flowing through the windings are switched on and off to cause such magnetic field changes. The field direction and rotor orientation is always determined by the sum of the various field vectors. Thus as the field in one winding decays, the field shifts direction causing the rotor to move. This action is true whether or not the rotor is of the permanent magnet type. Such rapidly switched currents cause the magnetic field to change inducing a rapid short predetermined rotor movement, thereby the name "stepper motor."

A limitation on the speed of a stepper motor is that the changes in the magnetic fields in windings must be complete before a new stepping action is initiated. For example, if current switching action is initiated before the rotor has reached its newly desired position in a stable manner, the rotor does not accurately follow the changing magnetic field; that is, the rotor may stall or assume some alignment other than the desired one. Both the manner of switching the electrical currents and the collapse of the magnetic field after the field inducing current has stopped have a material effect on the response of a stepper motor.

Ability of the rotor to follow a changing stator field is proportional to the intensity of the magnetic field which in turn depends upon the current amplitude in the windings. One way to attempt faster current switching in stepper motors is to increase the winding current amplitude. When a higher inducing voltage is used to increase current amplitude, inductance (L) of the windings limits such increased current used to obtain a faster stepping operation. For example, it may be desired to increase the current amplitude from 0 to 1.5 amperes in less than two milliseconds. Some stepper motors would overheat under such operating conditions. To prevent overheating of such motors, a series resistance has been inserted between the current source and the windings. In fact, such a technique is recommended by stepper motor manufactures. In one stepper motor, a series resistance (R) of 40 ohms was inserted in series with stator windings when a 60 volt power supply was used to energize the windings. The resistance was used to limit the current to 1.5 amperes. The final current increase was twelve times as fast an increase as that provided by a 5 volt supply. Therefore it is desired to use a high voltage to obtain a rapid rise in stator current amplitude.

As winding current amplitude increases, the voltage across the winding decreases. The result is that there is a logarithmic relation of current amplitude to time approaching the limiting value of current in an asymptotic manner. For example, in one time constant (LR) of the winding actuation circuit, the current amplitude flowing through the winding reaches only $(e-1)/e$ of the final 1.5 ampere value or approximately 1 ampere. The value $e$ is the natural log base. This fact emphasizes the effect of winding inductances and series resistance on limiting stepper motor operation when using known speed-up techniques. For example, if the series resistance (R) is eliminated, at least a 50% faster responsive stepper motor is obtained. This improvement indicates need for constant-current variable-voltage supply for actuating stepper motor windings. Further, for a given response of a stepper motor, an electronically current limited supply requires about $\frac{2}{3}$ as large a power supply if the series resistor were eliminated. Therefore, an approach to speed up a stepper motor without a series resistance appears highly desirable.

Increasing the current amplitude in a rapid manner is one half the problem of rapidly operating stepper motors. The other half of the problem is to quickly stop the current flow in the winding and thus cause the magnetic field to rapidly collapse.

It is well known that the inductance of motor windings tends to preserve the rate of current flow. Any loop circuit including a winding having a magnetic field thereabout will have a current continuing to circulate for considerable time even after field inducing current flow has terminated, and therefore, the resultant magnetic field will be maintained in the motor a proportionate time. Such loop circuits and continuing current causes a rotor of a stepper motor to oscillate around a desired position. Such oscillation reduces the accuracy of the stepping motor in making positioning movements and also slows motor response. Therefore, for rapid operations, the magnetic field in a stepper motor winding must be quickly collapsed.

The quantity of magnetic energy in the winding to be removed after a field inducing current is turned off is the product of the current amplitude and inductance of the winding. Also, the magnetic field decay time is inversely proportional to the reactive voltage (flyback voltage) generated in the winding. When the magnetic field inducing current has a constant-current or current-limited (assuming maximum amplitude is always reached in each winding actuation) amplitude, the current amplitude at the time of magnetic field inducing current turn off is the same for each repeated turn off. The energy stored in a winding is the same for each actuation. Reduced magnetic field decay time is provided by permitting the reactive or flyback voltage to increase several times the value of the current supplying voltage. Such reduced decay time can permit a stepper motor to rapidly and stably reach a new desired position, thereby permitting faster stepper motor operations.

In providing a current limited supply to the motor it must be considered that the motor winding is a time varying load. Therefore, because of such rapidly time varying load, the power dissipation in the current limited supply varies accordingly and must be accommodated. As in most electrical devices it is desired to use semiconductor devices. Such semiconductor devices are limited in their power dissipation. The greater the power dissipation capability of a semiconductor device, the greater its cost. By switching the power dissipation from a transistor or other semiconducted device to a resistor at high power levels, total cost of a system can be reduced since resistors capable of dissipating high power levels are less expensive than the corresponding semiconductor devices.

Current limited power supplies are used to supply a predetermined maximum amplitude of current into a varying load. The current limited supply operates from a fixed voltage source having a low internal impedance. Since the varying load may present a low impedance, it is necessary to provide means for reducing the voltage at the load while simultaneously passing the limited current thereto. When voltage is reduced or dropped and the limited current is passed, additional electrical power is dissipated in the supply.

One way to dissipate electrical power is to change it into heat by power resistors and semiconductor devices. However, semiconductor devices, such as transistors, have limitations in that when the voltage thereacross approaches maximum $V_{CE}$, the transistor does not conduct a large current without going into a condition called secondary breakdown. Such a condition permanently damages the transistor. Therefore, protection for power dissipating semiconductor devices should be provided. One way to accomplish such protection is by sharing the power dissipation between two or more transistors. This approach is expensive because of the cost of the transistors. In using power transistors in this manner, it is also possible to exceed the thermal capability of the transistors, thereby increasing the possibility of circuit failure. Therefore, there have been developed circuits which share the power dissipating resistor such that the resistor dissipates proportionately more power when there is a higher voltage across the power transistor. But circuits of this type have a decided disadvantage in that they require extensive additional circuitry in order to rapidly enable or disenable the power supply, i.e., turn it on or off.

SUMMARY OF THE INVENTION

It is an object of the present invention to provide a rapidly operating stepper motor control having low power dissipation.

It is another object of the present invention to provide a stepper motor control having a gated actuating current.

It is another object of the present invention to provide a current gating system wherein power dissipation in the gating system is shifted from one device to another in proportion to the voltage drop across the gating system.

A feature of the invention is the electrical interposition of a unidirectional current conducting device between a semiconductor switching device and a stepper motor winding with the unidirectional current conducting device being poled to conduct current in the normal direction of current flow through the semiconductor switch. The arrangement permits flyback voltages in the stepper motor winding to increase for reducing the magnetic field decay time.

Another feature of the present invention is the utilization of current passing through a power dissipating transistor to automatically switch to a power dissipating resistor.

Another feature is the provision of a gated high voltage utilized to step a stepper motor and a low voltage utilized to hold a stepper motor in a desired position.

A stepper motor control circuit utilizing the teachings of the present invention includes a pair of semiconductor switching devices, such as transistors, silicon controlled rectifiers and the like, connected through a pair of unidirectional current conducting devices, such as crystal diodes, respectively to opposing ends of a center tapped stepper motor winding. Such winding center tap is connected to a gated high voltage limited current supply. The arrangement is such as to permit high flyback voltages in the windings to reduce the magnetic field decay time. The gated current supply is characterized by a transistor which passes current up to a predetermined amplitude. As the voltage across the winding is reduced and the resultant voltage across the current switch is increased, power dissipation within the current switch is automatically shifted from the passing transistor to a resistor. The arrangement permits the usage of a lower power dissipation transistor than would be required without such switching action.

A current sensing amplifier receives a constant voltage from a DC voltage supply and regulates to a maximum predetermined amplitude. A Miller integrator type of control circuit is connected to both the current switch and a current sensing amplifier for turning the circuits on and off in a selected manner. A large capacitor is connected in between the motor winding and the current such as to store energy. When the winding draws current quickly, the capacitor discharge provides an excess of current supply thereby reducing the current requirements of the current switch. The excess of current is transitory in nature.

DESCRIPTION OF THE DRAWING

The attached figure is a schematic-block diagram of a circuit utilizing the teachings of the present invention.

DESCRIPTION OF THE ILLUSTRATIVE EMBODIMENT

DC power supply 10 supplies regulated plus 60 volts (+60 v.) through a current gating control circuit consisting of current sensing amplifier 15 and current switch and dissipating circuit 38 which in turn are under control of control circuit 19 A gated +60 v. is supplied over line 71 to the motor control circuits 60 and 61 which control the current flow through the stepper motor windings 46 and 47. Stepper motor 11 has a permanent magnet rotor in a motor of known design. As the currents are switched between the various portions to the windings 46 and 47 the inductive reactance in the windings provide a variable voltage thereacross in accordance wtih known principles. This appears as a variable load 34 which rapidly changes with time. The current switch 38 is designed such that the power dissipation therein is shifted from the semiconductor devices to a power dissipating resistor in accordance with the voltage differential between the current sensing amplifier 15 and line 71.

A plus 5 volts (+5 v.) is supplied from DC power supply 10 over line 75 to the windings 46 and 47 for holding the stepper motor 11 in a predetermined desired position. When the motor is to be stepped to a new desired position the current switch 38 supplies a gated +60 v. which then isolates the windings 46 and 47 from the +5 v. and is used to slip the stepper motor 11 to be stepped in acocrdance with sequences determined by sequence control 78. The particular sequence of current directions in the windings determine the direction of rotation of stepper motor 11, i.e., whether it rotates clockwise or counterclockwise. Flip-flops 66 and 67 control the motor control circuits 60 and 61 under the direction of sequence control 78. The present invention is directed toward a system of switching those currents in a rapid and reliable manner such that stepper motor 11 can be operated at high repetition rates and yet when in a desired position have low power dissipation. The sequencing of the current through stepper motor windings is well known and will not be further referred to for that reason. As an example, a stepper motor 11 using semiconductor switches for controlling the direction of current without incorporating the teachings of this invention was operated at a maximum of 500 pulses per second, i.e., 500 steps per second would be accomplished by stepper motor 11 without error. Using the present invention, the same motor without alteration except for the illustrated control circuits in the attached figure was successfully operated in excess of 3,000 pulses per second, i.e., 3,000 steps per second without error.

The gated current supply consisting of control 19, current sensing amplifier 15 and current switch dissipation circuit 38 is first described. Then the motor control circuit or load 34 is described as well as its responsiveness to the gated currents supplied from the gated current supply.

THE GATED CURRENT SUPPLY

The gated supply is best understood as having three parts, a current sensing amplifier 15, a current switch and power dissipation circuit 38 and circuit control 19. Control 19 is electrically switched on and off by a remote digital voltage source (not shown) for respectively passing and blocking limited amplitude currents through circuits 60, 61, and thence windings 46 and 47.

In current sensing amplifier 15 the emitter electrode of the current sensing transistor 14 and current sensing resistor 18 receive current at +60 v. over line 10A from power supply 10. Variable resistor 12 is in parallel circuit relation to low-impedance current sensing resistor 18. The resistor 12 has an electrical impedance much greater than the impedance of resistor 18; for example, resistor 12 may be variable from one kilohm to three kilohms, while resistor 18 has an impedance of 0.33 ohms. Therefore, large adjustments of variable resistor 12 provide a fine adjustment of the electrical impedance across resistor 18. Resistor 17 is a base current limiting resistor for transistor 14 and may have an impedance of one kilohm. Other equivalent resistive networks may be used to provide the later described current amplitude responsive biasing of transistor 14 to accomplish current amplitude limiting.

The current switch and power dissipating circuit 38 has three transistors 20, 22, and 24 and power dissipating resistor 26. Transistors 20 and 22 are connected in the well known Darlington configuration with the emitter electrode of transistor 20 connected to the base electrode of transistor 22. The Darlington connected transistors 20 and 22 are considered as one semiconductor amplifier unit 23 having emitter 23e, base 23b and collector 23c terminals. In unit 23, most of the power dissipation is in transistor 22. Transistor 24 is used to switch current flow between power dissipating resistor 26 and unit 23 in accordance with the base drive supplied to transistor 24 at emitter terminal 23e. Under normal current limiting operations, transistor 24 is operated at collector current saturation. At small amplitudes of load current, i.e., those amplitudes well below the predetermined upper amplitude limit, transistor 24 may operate at less than collector current saturation.

Line 71 is connected to emitter terminal 23e and through power dissipating resistor 26 to the collector electrode of transistor 24. The emitter electrode of transistor 24 receives current from amplifier 15. When power dissipation in circuit 38 is low, i.e., a high load 34 impedance, most current flows from the emitter of transistor 24 through transistor 22 via the base electrode of transistor 24. At high power dissipation in circuit 38, i.e., load 34 impedance is low, current is shifted from transistor 22 to flow through resistor 26 via the collector electrode of transistor 24. The base terminal 20b receives control signals from control circuit 19 over line 27 to control circuit 38 operation as will be fully described with respect to circuit 19.

Control 19 is a Miller integrator circuit including transistor 32 and integrating capacitor 30. Operation of such an integrator circuit is well understood and will not be described. The base electrode of transistor 32 is connected through limiting resistor 36 to control input terminal 37. The collector of transistor 32 is connected via the collector load resistor 28 to the base terminal 23b of semiconductor unit 23 and to the collector electrode of transistor 14.

Operation of the gated current supply is now described. It performs three functions; gating a current, limiting current amplitude, and dissipating a variable power level.

Circuit 38 is gated on to conduct current in response to a positive signal on terminal 37. Transistor 32 becomes current conductive. The voltage on collector electrode 29 approaches ground reference potential causing semiconductor unit 23 to be biased to current conduction. This action supplies a base drive current to transistor 24, effecting current flow between power supply 10 and line 71.

Current switch 38 is opened to block current flow by the receipt of a negative signal on control input terminal 37 to make transistor 32 current nonconductive. This action makes the voltage on line 27 positive to bias semiconductor unit 23 to current nonconduction thereby making transistor 24 nonconductive. As is well known, capacitor 30 delays the turn off of transistor 32 a short time. Such a delay is not necessary to the successful practice of this invention. Such delay was utilized in the illustrative embodiment to ensure the completion of the last step of stepper motor 11 as it reached a newly desired position.

Upon current being supplied, the current amplitude limiting function begins. Since sense resistor 18 has a very small impedance (for example, 0.33 ohms), the voltage on line 27 is approximately the voltage on line 10A less the nearly constant base-to-emitter voltage drops of transistors 20, 22, and 24, which of course determines the voltage drop between the emitter and collector electrodes of transistor 14. Therefore, during the supplying of current to load 34, line 27 tends to remain at a constant potential even though the amplitude of current through transistors 14, 20, 22, and 24 changes. That is, as the load 34 resistance decreases, the amplitude of current flowing through current sensing resistor 18 increases by a small amount. If current flowing through the current sensing resistor 18 is sufficient to bias transistor 14 to current conduction, the increase in voltage drop across resistor 18 further increases the conductivity of transistor 14. This action causes more current to flow from transistor 14 through resistor 28. But, because of the constant voltage drop (therefore a constant current flow) across resistor 28, when the amplitude of current from transistor 14 increases, the amplitude of current flowing through base terminal 23b decreases a corresponding amount. As terminal 23b current amplitude decreases, there is a resulting decrease in conductivity of unit 23 and thence transistor 24 thereby limiting the amplitude of current flow over line 71 in accordance with the inverse of the impedance of resistor 18. That is, the greater the electrical impedance of resistor 18, the lower the maximum amplitude of current flow over line 71. Of course, the electrical parameters of transistors 14, 20, 22, and 24 also have an effect on the maximum current amplitude. By adjusting variable resistor 12, the maximum current amplitude can be adjusted within a limited range to permit the use of a 10% tolerance resistor rather than a precision (1%) resistor for resistor 18. This arrangement reduces cost and provides adjustment flexibility.

When supplying a maximum current amplitude to load 34 having a time varying impedance, power dissipation in the gated supply varies on the same time basis and must be accommodated. As the value of the load 34 impedance decreases, the voltage on line 71 decreases causing a corresponding increase in voltage drop across the gated current supply between lines 10A and 71. This increased voltage drop appears largely across dissipation circuit 38.

The accommodation of such varied power dissipation is described with respect to a decreasing load impedance. This situation illustrates how circuit 38 responds to increased voltage drop thereacross to accommodate increased power dissipation. Current switch and dissipation circuit 38 is responsive to an increasing voltage drop thereacross to increase current flow through resistor 26 and decrease current flow through semiconductor unit 23. At load 34 dynamic resistances greater than resistor 26 resistance (voltage drop across circuit 38 is small) semiconductor unit 23 dissipates a major portion of the power dissipated in circuit 38. When the load 34 dynamic resistance becomes smaller than the resistor 26 resistance, resistor 26 dissipates more and more of the circuit 38 power. When the load 34 resistance is one half the resistance of resistor 26, the power dissipation is equally shared by semiconductor unit 23 and resistor 26. When load 34 has zero resistance, practically all the 60 volts from power supply 10 appears across circuit 38 and resistor 26 dissipates practically all the power dissipated within circuit 38.

The diversion of current from secimonductor unit 23 to load resistor 26 at increasing voltage amplitudes across current switch and dissipation circuit 38 is now described.

Upon initial turn on with very low load current flowing over line 71 both transistors 20 and 22 in unit 23 are at collector current saturation. As current increases a small amount, it is passed by transistor 22 through the base-emitter junction of transistor 24. Both transistors 20 and 22 remain at collector current saturation until the current supplied over line 71 reaches a maximum limiting amplitude, such as 3 amperes. Such current limit is determined by the current sensing amplifier 15 as above described. As the load increases, i.e., the dynamic resistance of the load is decreasing, the voltage on line 71 decreases. This change results in a voltage increase across transistor 22. Transistor 24 remains at collector current saturation. Since transistor 24 is at collector current saturation, such transistor will not absorb an increased voltage thereacross. Therefore, for voltage increases across circuit 38, there is a corresponding voltage increase across resistor 26. Then, even though the voltage drop across dissipation circuit 38 increases there is no corresponding increase in current amplitude because of the limiting action of current sensing amplifier 15. Therefore, as the voltage on line 71 decreases (there is a resulting increase in voltage drop across and current flow through resistor 26), the limited amplitude current is diverted from transistor 22 to resistor 26. This diversion shifts power dissipation from transistor 22 to resistor 26.

When the voltage on line 71 is zero, transistor 22 is passing only sufficient current to cause transistor 24 to be current conductive. For this configuration it is typically 100 milliamperes of base current. Transistor 24 is still at collector current saturation supplying the three ampere current through resistor 26. At this operating point, transistors 20 and 22 are no longer at collector current saturation.

The maximum power dissipation of a typical transistor utilized for transistor 24, such as a Motorola 2N3792, is about two or three watts. Since this transistor has a high power rating the three watt power dissipation is considered negligible for the three ampere current flow therethrough. The power dissipation in transistor 22 is at maximum when the voltage on line 71 is one half the voltage on line 10A. This corresponds to the dynamic load impedance of load 34 being equal to one-half the resistance of resistor 26. At this time resistor 26 has a current flow of 1.5 amperes with a current flow of substantially 1.5 amperes through transistor 22. There is a 45 watt power dissipation in resistor 26 as well as in transistor 22. While this power dissipation for transistor 22, such as in a Motorola 2N3792, is not difficult, of greater significance is that the power dissipation is at a voltage low enough to not cause secondary breakdown. Such lower voltage permits the selection of a transistor costing less than another transistor type capable of sustaining the same power dissipation at a higher voltage amplitude.

STEPPER MOTOR CONTROL CIRCUIT

The detailed construction of stepper motor control circuits 60, 61 for the X stepper motor 11 is described. The control circuits 60 and 61 are identically constructed with the circuit 60 being illustrated in detail. Drive circuit 60 actuates the center tapped winding 46 while drive circuit 61 actuates center tapped winding 47 in a particular sequence to cause stepper motor 11 to rotate either in a clockwise or counterclockwise direction, as will be described. Drive circuits 60 and 61 receive actuating signals respectively over signal paths 62 and 63 and signal paths 64 and 65.

Drive circuit 60 has a pair of semiconductor switching devices 68 and 70, shown as transistors, having their collectors respectively connected to opposing ends of stepper motor winding 46. It is understood that winding 46 may be two separate windings, each having one end joined at the illustrated center tap connection. The center tap connection of winding 46 is connected to line 71 which carries the gated +60 v. from current switch 38. Signal paths 62 and 63 are coupled to the base electrodes of switching devices 68 and 70 through control transistors 72 and 73. The arrangement is such that whenever a transistor actuating signal is supplied over signal path 62, a corresponding transistor deactuating signal is supplied over signal path 63, and vice versa. In this manner, one and only one of the semiconductor switching devices 68 and 70 is conductive at a given time, and also when one is switched to nonconduction, the other is switched to current conduction. A later described flip-flop is used to supply such actuating and deactuating signals.

In the illustrated embodiment, a relatively negative or low voltage supplied over signal path 62 causes control transistor 72 to become current conductive, thereby supplying base drive to semiconductive switching device 68 making it highly conductive. Simultaneously therewith, a relatively positive voltage is supplied over signal path 63 to control transistor 73 making it nonconductive to remove the base drive current from semiconductor switching device 70, thereby making it electrically nonconductive. With this arrangement, current will flow from line 71 to the center tap connection of winding 46, thence in one of two directions as determined by the conductivities of the semiconductor switching devices 68 and 70 to selectively provide a magnetic field in stepper motor 11 of a given polarity.

By repetitively changing the signals on signal paths 62 through 65 inclusive and thereby successively moving the magnetic field in stepper motor 11 with respect to the permanent magnet rotor, repetitive stepping operations are effected in either the clockwise or counterclockwise direction.

When the stepper motor 11 has reached a desired position, current switch 38 is closed, removing the gated +60 v. signal from line 71.

It is desired to have a magnetic field produced by windings 46 and 47 to be continued to ensure that the rotor of stepper motor 11 precisely maintains itself in the desired position. To this end, a +5 v. potential is supplied over line 75 to both stepper motor control circuits 60 and 61. The +5 v. also serves as a power supply voltage for the control transistors 72 and 73. The motor position holding current is supplied to the windings 46 and 47 through current limiting resistor 76. Diode 77 is electrically interposed between the center tap connections of windings 46 and 47 (as well as line 71) and resistor 76.

The diode or unidirectional current conducting device 77 is poled such as to conduct current between the supply line 75 and the winding 46 only when the potential on line 71 has been removed, i.e., is less positive than the line 75 +5 v. At other times, diode 77 is reverse biased to isolate the higher voltage potential (60 v.) on line 71 used in stepping the motor 11 from reaching the +5 v. supplied over line 75. This arrangement greatly reduces the power dissipation in steeper motor 11 while it is not being stepped. It is understood that the +60 v. on line 71 could be left to provide a holding field in motor 11. However, large current amplitudes are involved which, of course, means power loss within the motor causing it to heat up. By supplying a relatively low voltage, such as +5 v., over line 75 limited by resistor 76 to the windings 46 and 47, sufficient magnetic fields are generated to keep stepper motor 11 accurately maintained in a desired position. When it is again desired to cause the stepper motor to move to a new position, the current switch 38 is again enabled to supply the gated +60 v. to the center tap connections of the stepper motor windings, thereby again reverse biasing the unidirectional current conducting device 77.

During the repetitive stepping operations, while stepper motor 11 is moving toward a desired position, the semiconductor switching devices 68 and 70 are repetitively switched between high current conduction and current nonconduction.

WHAT HAPPENS IS THIS

When one of the switching devices, for example switching device 68, is changed from current conduction to current nonconduction, the current flowing in the motor winding tends to persist due to inductance. If there were a low resistance path for this current, the flow and the magnetic field induced would persist for a relatively long time. Because the switching transistor 68 has changed to nonconduction there is no low resistance path and the voltage at the collector of switching device 68 rises rapidly seeking a dissipation path. At the same time the opposite end of the center tapped motor winding is going negative. If diode 81 were not in the circuit a path for conduction would be found through current conducting switching device 70. The negative going excursion would be amplitude limited and likewise the positive going excursion of the collector of switching device 68. However, with diode 81 in the circuit there is no conduction path found by the negative excursion of the diode 81 end of the motor winding. Thus the diode 80 end can continue to rise in voltage. At about +400 volts the collector-base diode of switching device 68 undergoes Zener breakdown and the stored magnetic energy rapidly dissipates through that path as electrical current. Because the stored energy in the inductance is dissipated at high voltage, it decays in a relatively short time. The limit to the voltage swing in winding 46 is determined by the collector-to-emitter breakdown voltage ($V_{CE}$) of the semiconductor switching devices 68 and 70. By making this value of the breakdown voltage high, the reverse voltage is across both the diodes 80, 81 and transistors 68, 70 at each respective end of winding 46. The stored energy in the winding inductance is permitted to be dissipated quickly through the Zener breakdown of those switching devices.

Sequence control circuit 78, which is a logic circuit designed to sequentially supply pulses over lines 69 to selectively set and reset flip-flops 66 and 67 in a predetermined order, consists of gating circuits of known design interconnected in a known manner to provide a sequence of operations. As the flip-flops are sequentially set and reset, respective positive (deactuating) and negative (actuating) signals are supplied over signal paths 62–65 to switch the conductivities of devices 68 and 70. This action provides currents in windings 46 and 47 to effect actuation of stepper motor 11 in either a clockwise or counterclockwise direction.

What is claimed is:
1. A control circuit for actuating a load with a time varying impedance and having first, second and third terminals, the improved circuit including the combination,
   a first constant-current power supply having a relatively high output voltage amplitude and connected to said second terminal and having first switching means for interrupting said constant-current,
   a second current source having a relatively low output voltage amplitude,
   second and third switching means connected respectively to said first and third terminals for selectively completing electrical circuit connections between said first and third terminals and said current supplies,
   a unidirectional current conducting means connected between said second current source and said second terminal and poled to be biased to current nonconduction whenever said first constant-current source is supplying current at said high voltage amplitude to said second terminal but being biased to conduct current whenever said first constant-current source is not supplying this current to said second terminal.

2. A winding actuating circuit for connection to first and second ends and to a tap on a winding,
   the improvement including in combination,
   first and second semiconductive switching devices, each having first and second current path electrodes and a control electrode for receiving signals to selectively make a current conductive path or a current nonconductive path between the respective current path electrodes,
   limited amplitude current supply means connected to said tap for supplying a high voltage thereto,
   first and second unidirectional current conducting devices electrically connecting the opposite ends of said winding to said first current path electrodes of said semiconductor switching devices, respectively,
   said second current path electrodes being connected together and to said current supply means, and
   input circuit means connected to said control electrodes for selectively supplying actuating and deactuating control signals to said control electrodes such that one of said devices is always switched to provide a conductive current path while another of said devices is always switched to provide a current nonconductive path,
   low voltage means connected to said tap on said winding and including a third unidirectional current conducting device which is biased to current nonconduction whenever said high voltage is supplied to said tap and said first and second unidirectional current conducting devices electrically isolating said semiconductor switching devices from said winding immediately after the respective devices have been turned off and the poling of said first and second unidirectional current conducting devices being such as to conduct current in a forward direction through said semiconductor switching devices when such devices are providing a current conductive path.

3. The actuating circuit of claim 2 further including gating means electrically interposed between said current supply means and said tap for selectively turning said high voltage on and off.

4. The actuating circuit of claim 3 wherein said limited amplitude current supply means includes gating means for selectively supplying said high voltage to said tap, said gating means including current diversion means for adjusting the current flow from a semiconductor means to a resistor means in accordance with the voltage across said winding.

5. The actuating circuit of claim 4 further including a capacitor connected between said tap and said limited amplitude current supply means for supplying a transitory larger amplitude current through said windings than would be supplied by said limited amplitude current supply means.

6. The actuating circuit of claim 4 wherein said gating means includes a power transistor capable of dissipating a given amount of power and having a pair of current path electrodes and a control electrode with one of said current path electrodes receiving current to be passed to said tap, said resistor means connected between said tap and another of said current path electrodes on said power transistor, said semiconductor means comprising a Darlington type semiconductor unit having base and current path terminals with one of said current path terminals connected to said control electrode of said power transistor and another of said current path electrodes in said Darlington type semiconductor unit being connected to said tap and said Darlington semiconductor unit being responsive to signals on said base terminal for selectively making said power transistor current conductive or nonconductive.

7. The subject matter of claim 6 further including a Miller type integrator semiconductor switching means having an output portion connected to said base terminal and having an input terminal for receiving control signals.

8. The subject matter of claim 7 further including a current sensing and amplitude limiting amplifier means for supplying a limited amplitude current to said one current path electrode of said power transistor, said current sensing and amplitude limiting amplifier means including means for receiving constant voltage power with a variable current amplitude, and including a current sensing transistor connected between said base terminal and said receiving means for supplying current therethrough and having a control electrode, a small impedance resistor connected between said receiving means and said one current path electrode of said power transistor, resistive circuit means coupling said low impedance resistor to said control electrode of said current sensing transistor such that the voltage drop across said low impedance resistor appears as a bias across said current sensing transistor to thereby limit the current flowing through said low resistance resistor by supplying a corresponding control signal to said base terminal.

References Cited

UNITED STATES PATENTS

| | | | |
|---|---|---|---|
| 3,302,083 | 1/1967 | Tanaka et al. | 318—138 |
| 3,344,325 | 9/1967 | Sklaroff | 318—138 |
| 3,346,792 | 10/1967 | Noumi | 318—138 |
| 3,364,408 | 1/1968 | Katz et al. | 318—138 |
| 3,444,447 | 5/1969 | Newell | 318—138 |

G. R. SIMMONS, Primary Examiner

U.S. Cl. X.R.

318—434